United States Patent
Egami

(10) Patent No.: US 8,076,884 B2
(45) Date of Patent: Dec. 13, 2011

(54) CONTROL APPARATUS FOR ELECTRIC VEHICLES

(75) Inventor: Tsuneyuki Egami, Gamagori (JP)

(73) Assignee: Denso Corporation, Kariya (JP)

( * ) Notice: Subject to any disclaimer, the term of this patent is extended or adjusted under 35 U.S.C. 154(b) by 448 days.

(21) Appl. No.: 12/432,205

(22) Filed: Apr. 29, 2009

(65) Prior Publication Data

US 2009/0278483 A1 Nov. 12, 2009

(30) Foreign Application Priority Data

May 9, 2008 (JP) .................................. 2008-122930

(51) Int. Cl.
*H02P 7/00* (2006.01)
(52) U.S. Cl. .......... 318/432; 318/802; 318/800; 318/700
(58) Field of Classification Search ................... 318/400, 318/432
See application file for complete search history.

(56) References Cited

U.S. PATENT DOCUMENTS

| | | | | |
|---|---|---|---|---|
| 5,585,708 A | * | 12/1996 | Richardson et al. | 318/800 |
| 5,811,957 A | * | 9/1998 | Bose et al. | 318/802 |
| 2004/0100221 A1* | | 5/2004 | Fu | 318/700 |
| 2007/0001635 A1* | | 1/2007 | Ho | 318/254 |

FOREIGN PATENT DOCUMENTS

| | | |
|---|---|---|
| JP | 08-214592 | 8/1996 |
| JP | 2004-048983 | 2/2004 |
| JP | 2004-112957 | 4/2004 |
| JP | 2004-343916 | 12/2004 |
| JP | 2005-045880 | 2/2005 |
| JP | 2007-020383 | 1/2007 |
| JP | 2007-306658 | 11/2007 |
| JP | 2007306658 A | * 11/2007 |
| WO | WO 2006/134848 | 12/2006 |
| WO | WO 2007/069055 | 6/2007 |
| WO | WO 2007/069413 | 6/2007 |

* cited by examiner

*Primary Examiner* — Walter Benson
*Assistant Examiner* — Jorge Carrasquillo
(74) *Attorney, Agent, or Firm* — Nixon & Vanderhye P.C.

(57) ABSTRACT

A motor control apparatus for an electric vehicle has an AC motor system including a power conversion unit and a motor/generator. The power conversion unit performs conversion between DC power and AC power to drive the motor/generator. The motor control apparatus further includes a decoupling control section configured to perform decoupling control, which restricts interference between system voltage control and motor torque control, by correcting a control state amount of one of the system voltage control and the motor torque control by a control state amount of the other of the system voltage control and the motor torque control.

7 Claims, 3 Drawing Sheets

CONTROL APPARATUS FOR ELECTRIC VEHICLES

CROSS REFERENCE TO RELATED APPLICATION

This application is based on and incorporates herein by reference Japanese Patent Application No. 2008-122930 filed on May 9, 2008.

FIELD OF THE INVENTION

The present invention relates to a control apparatus for electric vehicles, which reduces mutual interference between voltage control and torque control in an AC motor system.

BACKGROUND OF THE INVENTION

Various hybrid electric vehicles are proposed to reduce emission of carbon dioxides ($CO_2$) of an internal combustion engine for the purpose of environment protection. As a motive power source of the hybrid electric vehicle, an AC motor and a high voltage main power source (DC power source) are mounted on the vehicle in addition to the engine. For improving fuel efficiency, it is required to further improve drive efficiency of the AC motor and reduce size of the AC motor.

To meet these requirements, JP 8-214592A (patent document 1) proposes to chopper-boost a voltage of a DC power source to generate a boosted system voltage, convert this DC system voltage into an AC voltage by an inverter and drive the AC motor with the AC voltage. JP 2005-45880A (patent document 2) proposes to switch over a control mode of an AC motor among a sine-wave PWM control mode, a rectangular-wave control mode and an over-modulation PWM mode in accordance with an operating condition of the AC motor. JP 2007-306658A (patent document 3) proposes to vary a target value of a system voltage boosted by a boosting converter in accordance with a control mode of an AC motor. In the patent document 3, the boosting converter is controlled so that the system voltage produced actually attains the target value, and an inverter is controlled to adjust an AC voltage supplied to the AC motor so that an output torque of the AC motor produce actually attains a target torque.

In the AC motor drive systems proposed by the patent documents 1 to 3, in which the voltage of the DC power source is boosted by the boosting converter and the boosted system voltage is converted into the AC voltage, a current flowing in the AC motor varies and hence the output torque of the AC motor varies, when the system voltage varies and the AC voltage supplied to the AC motor varies.

In the systems, which perform both voltage control and torque control, the boosting converter is controlled to attain the target system voltage by the voltage control and the inverter is controlled to attain the target output torque of the AC motor. The variation in the system voltage caused by the voltage control influences the output torque of the AC motor and the variation in the output torque (variation in the AC voltage) of the AC motor caused by the torque control influences the system voltage. That is, the voltage control and the torque control interfere each other, thus lowering performance of the voltage control and the torque control and causing variations in the system voltage and the output torque.

If the system voltage on a system power supply line varies and reaches an over-voltage, electronic devices connected to the system power line may be broken due to the over-voltage. To suppress generation of an excessive voltage, WO 2007/069413A1 corresponding to JP 2007-166875A (patent document 4) proposes to reduce a target value of a system voltage in a case of rectangular-wave control or over-modulation PWM control of an AC motor to be lower than in a case of sine-wave PWM control.

According to the patent document 4, the system voltage is reduced in the case of rectangular-wave control or over-modulation PWM control of the AC motor to be lower than in the case of sine-wave PWM control to suppress the over-voltage. However, this control reduces the target voltage of the system voltage uniformly in the rectangular-wave control. Therefore, the system voltage cannot be used effectively and hence the performance of the AC motor will be lowered.

SUMMARY OF THE INVENTION

It is therefore an object of the present invention to provide a control apparatus for electric vehicles, which enhances performance of voltage control and torque control by preventing interference between the voltage control and the torque control.

According to one aspect of the present invention, a motor control apparatus for an electric vehicle comprises a motor/generator, a voltage conversion unit, a power conversion unit and a motor control unit. The voltage conversion unit is connected between a DC power source and a system power line for supplying a DC system voltage to the system power line by converting a voltage of the DC power source. The power conversion unit is connected to the system power line and configured to perform conversion between DC power and AC power.

The motor control unit includes a voltage control section, a torque control section and a decoupling control section. The voltage control section performs voltage control, so that the system voltage attains a target voltage. The torque control section performs torque control, which controls the power conversion unit, and adjusts a phase of the AC voltage supplied to the motor/generator so that an output torque of the motor/generator attains a target torque. The decoupling control section performs decoupling control, which restricts interference between the voltage control and the torque control by correcting a control state amount of one of the voltage control and the torque control by a control state amount of the other of the voltage control and the torque control.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
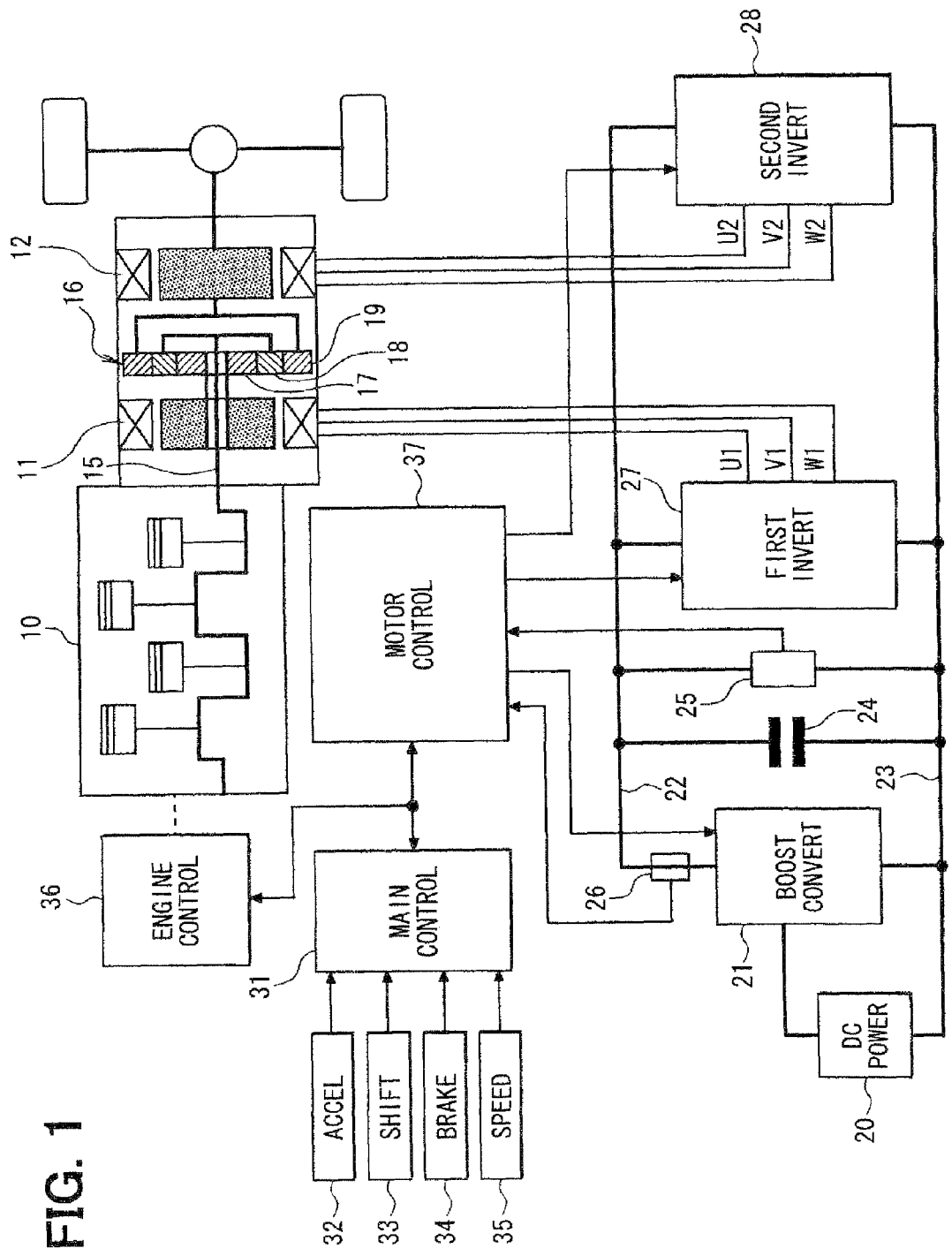
FIG. 1 is a block diagram showing a driving system for an electric vehicle in accordance with one embodiment of the present invention.

Referring first to FIG. 1, an electric vehicle has an internal combustion engine 10 in addition to a first AC motor 11 and a second AC motor 12. Thus, the electric vehicle is a hybrid electric vehicle The engine 10 and the second AC motor 12 are mainly employed as drive power sources for driving the electric vehicle. Motive power generated by a crankshaft 15 of the engine 10 is divided or split into two paths by a planetary gear set 16. The planetary gear set 16 includes a sun gear 17, planetary gears 18 and a ring gear 19. The sun gear 17 rotates at its radial center. The planetary gears 18 rotate along a circumference external to the sun gear 17 while revolving around its radial center. The ring gear 19 rotates along a circumference external to the planetary gears 18. The planetary gears 18 are linked to the crankshaft 15 of the engine 10 through carriers not shown in the figure. On the other hand, the ring gear 19 is linked to a rotation shaft of the second AC motor 12. The sun gear 17 is linked to the first AC motor 11.

A secondary battery serving as a DC power source 20 is connected to a voltage boosting converter 21 serving as electric power conversion means. The voltage boosting converter 21 is a component having a function for increasing the DC voltage output by the DC power source 20 in order to generate a DC system voltage supplied between a system power line 22 and a ground line 23 as well as a function for decreasing the system voltage in order to return or restore power to the DC power source 20. A smoothing capacitor 24 for smoothing the system voltage and a voltage sensor 25 serving as voltage detection means for detecting a value of the system voltage are connected between the system power line 22 and the ground line 23. A current sensor 26 serving as current detection means is placed on the system power line 22 as means for detecting a current flowing through the system power line 22.

In addition, a three-phase first inverter 27 and a three-phase second inverter 28 are also connected between the system power line 22 and the ground line 23. The three-phase first inverter 27 and the three-phase second inverter 28 are each a three-phase inverter of a voltage control type. The three-phase first inverter 27 drives the first AC motor 11, whereas the three-phase second inverter 28 drives the second AC motor 12.

A main control unit 31 is a computer for executing overall control on the electric vehicle as a whole. The main control unit 31 acquires signals output by a variety of sensors and switches in order to detect an operating state of the electric vehicle. The sensors and the switches include an accelerator sensor 32, a shift position switch 33, a brake switch 34 and a vehicle speed sensor 35. The accelerator sensor 32 is a sensor for detecting an accelerator operation amount representing an operation amount of an acceleration pedal. The shift position switch 33 is a sensor for detecting gear shift position of the electric vehicle. The gear shift position can be a parking position (P), a rear driving position (R), a neutral position (N) or a forward driving position (D). The brake switch 34 is a switch for detecting a braking operation. The vehicle speed sensor 35 is a sensor for detecting a value of the travel speed of the electric vehicle. The main control unit 31 exchanges control and data signals with an engine control unit 36 and a motor control unit 37 to control the engine 10, the first AC motor 11, the second AC motor 12 and the boosting converter 21 in accordance with the operating state of the electric vehicle. The engine control unit 36 is for controlling the operation of the engine 10, whereas the motor control unit 37 is for controlling the operations of the first AC motor 11, the second AC motor 12 and the boosting converter 21.

It is to be noted that the first AC motor 11 and the second AC motor 12 each also function as an electric power generator, when the first AC motor 11 and the second AC motor 12 are driven in the forward direction with negative torque or in the reverse direction with positive torque by the three-phase first inverter 27 and the three-phase second inverter 28 respectively to generate a negative torque. For example, when the electric vehicle is being decelerated, AC power generated by the second AC motor 12 as deceleration energy is converted into DC power by the three-phase second inverter 28 and the DC power is accumulated back in the DC power source 20.

Normally, a portion of power of the engine 10 is transferred to the first AC motor 11 by way of the planetary gear 18, causing the first AC motor 11 to operate as a generator for generating electric power corresponding to the portion of the power of the engine 10. The electric power generated by the first AC motor 11 is supplied to the second AC motor 12, causing the second AC motor 12 to operate as a motor The power of the engine 10 is divided into two paths by the planetary gear set 16. When a torque applied to the ring gear 19 of the planetary gear set 16 is greater than a torque required by a travel operation of the electric vehicle, the first AC motor 11 functions as a motor, drawing power of the engine 10. In this case, the second AC motor 12 functions as a generator generating power to be supplied to the first AC motor 11. Thus, each of the first AC motor 11 and the second AC motor 12 operates as a motor/generator.

Figure 2:
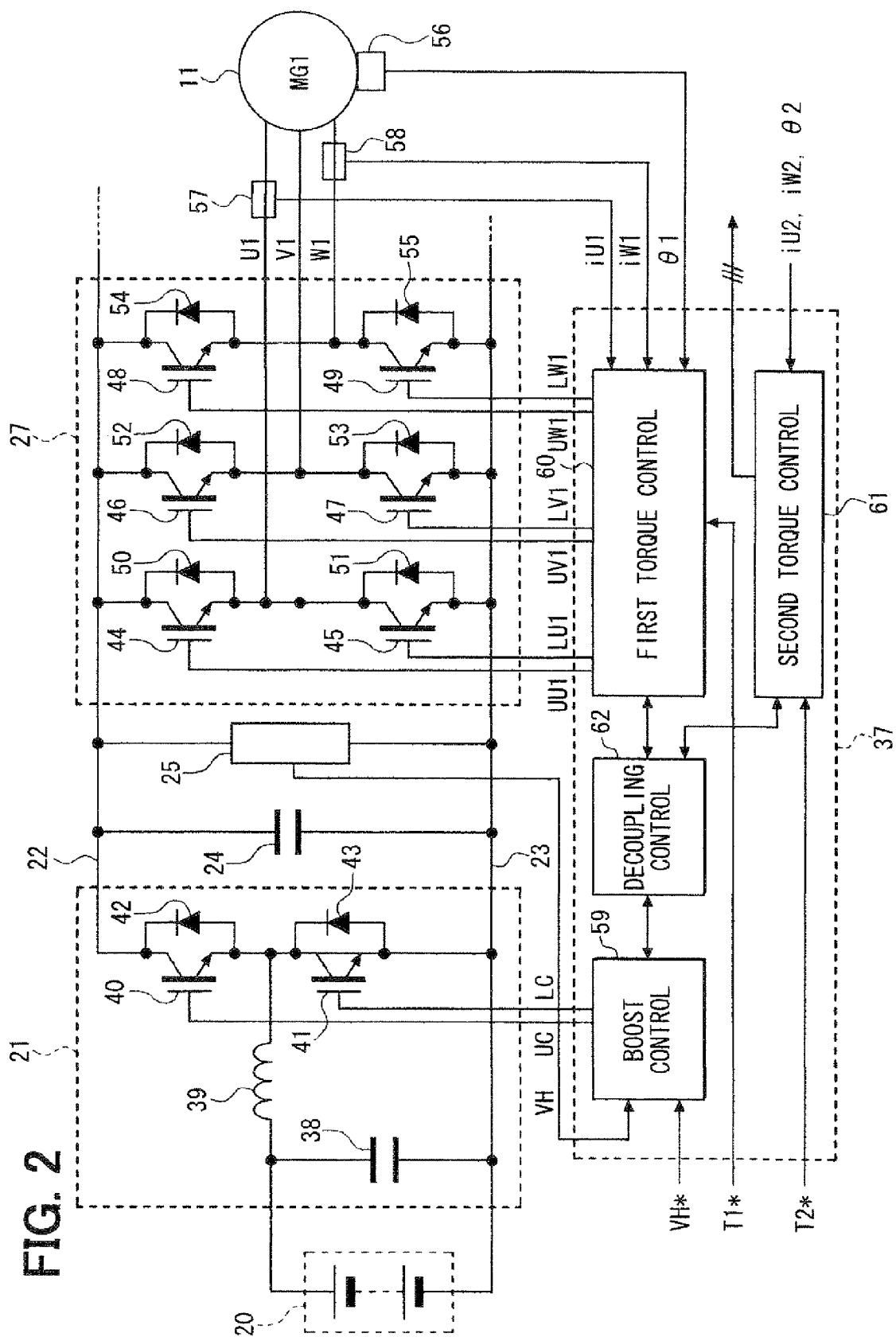
FIG. 2 is a block diagram showing an AC motor control part in the embodiment.

A first torque control system including the first AC motor 11 and the first inverter 27 is described in detail with reference to FIG. 2. A second torque control system including the second AC motor 12 and the second inverter 28 is configured similarly to the first torque control system and operates in the similar manner as the first torque control system.

The first AC motor 11 is a three-phase permanent magnet type synchronous motor, in which permanent magnets are encased and a rotor rotational position sensor 56 is provided. The boosting converter 21 includes an input capacitor 38, a reactor 39, two switching elements (transistors) 40, 41 and free-wheeling diodes 42, 43 connected in parallel to the switching elements 40, 41. The first inverter 27 is a voltage-controlled three-phase type, and includes bridge-connected six switching elements 44 to 49 and free-wheeling diodes 50 to 55 connected in parallel to the switching elements 44 to 49. Three switching elements 44, 46, 48 form upper arms of each bridge corresponding to each phase, and three switching elements 45, 47, 49 form lower arms of each bridge corresponding to each phase.

The first inverter 27 thus converts the DC voltage (system voltage boosted by the boosting converter 21) of the system power line 22 to three-phase AC voltages U1, V1, W1 thereby to drive the AC motor 11 in response to three-phase six-arm voltage instruction signals UU1, LU1, YV1, LV1, UW1, LW1 produced by the motor control unit 37. Current sensors 57 and 58 are provided to detect a U-phase current iU1 and a W-phase current iW1 supplied to the first AC motor 11, respectively.

The motor control unit 37 includes a boosting control section 59 serving as voltage control means, a first torque control section 60 serving as torque control means, a second torque control section 61 serving as torque control means and a decoupling section (separating section) 62 serving as decoupling control means.

The boosting control section 59 is configured to perform voltage control, by which the boosting converter 21 is controlled so that the system voltage VH actually produced attains a target voltage VH*. The first torque control section 60 performs torque control, by which the first inverter 27 is controlled so that an output torque T1 actually produced by the first AC motor 11 attains a target torque T1*. Thus, the AC voltage supplied to the first AC motor 11 is adjusted.

The decoupling control section 62 is configured to perform decoupling control so that the voltage control and the torque control do not interfere each other. Specifically, the decoupling control section 62 corrects a control state amount of the torque control (for example, phase φ1 of the AC voltage supplied to the first AC motor 11) in accordance with a control state amount of the voltage control (for example, a difference ΔVH between the target voltage VH* and the system voltage VH). Further, the decoupling control section corrects a control state amount of the voltage control (for example, turn-on duty ratio Dc of the switching elements 40, 41 of the boosting converter 21) in accordance with the control state amount of the torque control (for example, a difference ΔT1 between the target torque T1* and the output torque T1), a rotational speed of the first AC motor 11 or loss of the first inverter 27. The loss of the inverter 27 may be pre-measured with respect to various rotational speeds and torques, and stored to be retrieved and used in correcting the duty ratio Dc.

The voltage control, the torque control and the decoupling control performed by the motor control unit 37 are described in detail below.

(Voltage Control)

The boosting control section 59 calculates the difference ΔVH between the target voltage VH* outputted from the main control section 31 and the system voltage VH detected by the voltage sensor 25, and calculates the turn-on duty ratio Dc of the switching elements 40 and 41 of the boosting converter 21 by using a proportional-integral (P-I) control method so that the difference ΔVH may be reduced. The boosting control section 59 then calculates boosting drive signals UC and LC in accordance with the duty ratio Dc and outputs the drive signals UC and LC to the boosting converter 21.

(Torque Control)

The first torque control section 60 generates the three-phase voltage instruction signals UU1, UV1 and UW1 by the rectangular wave control method in accordance with the target torque T1*, the U-phase current iU1 and the W-phase current iW1 of the first AC motor 11 (output signals of the current sensors 57 and 58), and the rotor rotational position θ1 (output signal of the rotor rotational position sensor 56).

First, the first torque control section 60 calculates a rotational speed N1 of the first AC motor 11 in accordance with the rotor rotational position θ1 (output signal of the rotor rotational position sensor 56). The first torque control section 60 further calculates a current vector i1 (d-axis current id1 and q-axis current iq1) in accordance with the rotor rotational position θ1, the U-phase current iU1 and the W-phase current iW1 of the first AC motor 11 (output signals of the current sensor 57 and 58). The first torque control section 60 estimates the output torque T1 of the first AC motor 11 as follows.

$$T1 = pn \times \{ke \times iq1 + (Ld-Lq) \times id1 \times iq1\}$$

In this equation, pn, ke, Ld and Lq are constants of the AC motor 11, and represent respectively the number of pole pairs, the flux linkage, the d-axis inductance and the q-axis inductance, respectively.

The first torque control section 60 calculates the difference ΔT1 between the target torque T1* and the output torque T1 of the first AC motor 11, and calculates the phase φ1 of the rectangular wave voltage by using the P-I control method or the like so that the difference ΔT1 is reduced. The duty ratio of the rectangular wave voltage of each of the three phases is 50%.

The first torque control section 60 thereafter calculates the three-phase six-arm voltage instruction signals (rectangular wave voltage instruction signals) UU1, LU1, UV1, LV1, UW1, LW1 in accordance with the rotor rotational position θ1, the rotational speed N1 and the like of the first AC motor 11, and outputs these voltage instruction signals to the switching elements 44, 45, 46, 47, 48, 49 of the first inverter 27, respectively.

Thus, the first torque control section 60 performs the torque control, by which the phase φ1 of the AC voltage supplied to the first AC motor 11 is adjusted, by controlling the first inverter 27 so that the output torque T1 of the first AC motor 11 attains the target torque T1*.

Figure 3:
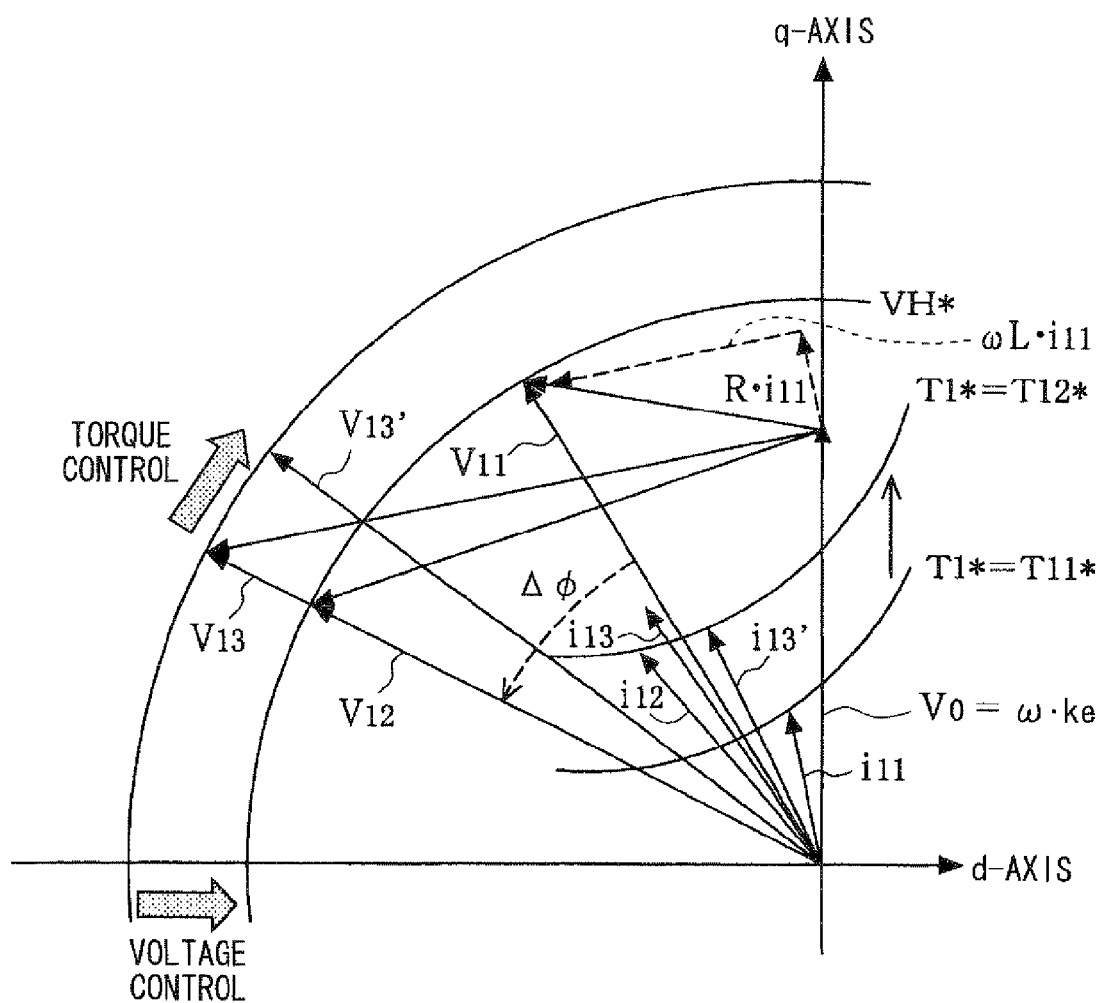
FIG. 3 is a diagram showing decoupling control operation in the embodiment.

As shown in FIG. 3, if the target torque T1* of the first AC motor 11 is varied from T11* to T12* for example, the phase φ of the AC voltage supplied to the first AC motor 11 is varied so that the voltage vector is varied from V11 to V12 and the current vector is varied from i11 to i12. As a result, the output torque T1 of the first AC motor 11 is controlled to the target torque T12*. In FIG. 3, ω, L, R and ke represent electrical angular velocity, inductance, stator winding resistance and flux linkage, respectively.

If the voltage vector of the first AC motor 11 is varied from V12 to V13 due to variation of the system voltage VH from the target voltage VH*, the current vector is varied from i12 to i13 and the output torque T1 of the first AC motor 11 is varied from the target torque T12.

In the system in which both the voltage control and the torque control are performed, the boosting converter 21 is controlled by the voltage control so that the system voltage VH attains the target voltage VH*, and the first inverter 27 is controlled by the torque control to adjust the phase φ of the AC voltage of the first AC motor 11 so that the output torque T1 of the first AC motor 11 attains the target torque T12*. In this case, the variation in the system voltage VH caused by the voltage control will influence the output torque T1 of the first AC motor 11, and the voltage control and the torque control interfere each other. As a result, the performance of the voltage control and the torque control are lowered thereby possibly causing variations in the system voltage or the output torque.

To counter this problem, the decoupling control section 62 performs the decoupling control in the following manner to prevent mutual interference between the voltage control and the torque control.

The decoupling control section 62 first calculates the difference ΔVH as the control state amount of the voltage control between the target voltage VH* and the system voltage VH, and calculates the torque control correction amount corresponding to the difference ΔVH by using mathematical equation, retrieving map data stored in a memory. The mathematical equation, the map data or the like is predetermined based on a relation between variation amounts of the system voltage VH and variation amounts of the output torque T1 of the first AC motor 11 by using design data, experimental data and the like. The torque control correction amount is set to the amount required to suppress the influence of the variation in the system voltage VH caused by the voltage control on the output torque T1 of the AC motor 11.

The control state amount of the voltage control may be calculated by differentiating the difference ΔVH between the target voltage VH* and the system voltage VH and variably setting the torque control correction amount in accordance with the calculated differentiation amount ΔVH. Alternatively, the control state amount of the voltage control may be calculated by integrating the difference ΔVH between the target voltage VH* and the system voltage VH and variably setting the torque control correction amount in accordance with the calculated integration amount of the difference ΔVH. It is also possible that the control state amount of the voltage control may be calculated by using two or all (three) of the difference ΔVH, the differentiation amount of the voltage difference and the integration amount of the voltage difference.

Each of the difference ΔVH between the target voltage VH* and the system voltage VH, the differentiation amount of the voltage difference and the integration amount of the voltage difference precisely reflects the variation in the system voltage caused by the voltage control. Therefore, by using these calculated amounts and the relation of the variations of the output torque T1 of the first AC motor 11 relative to the variations in the system voltage VH, the torque control correction amount, which is required to suppress influence of the variation in the system voltage VH caused by the voltage control, can be determined precisely.

After calculating the torque control correction amount, the phase φ1 of the AC voltage supplied to the first AC motor 11 is corrected in the torque control by using the calculated torque control correction amount. As a result, the variation in the system voltage VH caused by the voltage control is restricted from influencing the output torque T1 of the first AC motor 11.

Further, the difference ΔT1 between the target torque T1* and the output torque T1 is calculated as the control state amount of the torque control, and the voltage control correction amount is calculated in accordance with the calculated torque difference ΔT1 by using mathematical equation, retrieving map data stored in a memory.

The mathematical equation, the map data or the like of the voltage control amount is predetermined based on a relation between variation amounts of the system voltage VH and variation amounts of the output torque T1 of the first AC motor 11 by using design data, experimental data and the like. The voltage control correction amount is set to the amount required to suppress the influence of the variation in the output torque T1 (AC voltage variation) caused by the torque control on the system voltage VH.

The control state amount of the torque control may be calculated by differentiating the difference ΔT1 between the target torque T1* and the output torque T1 of the first AC motor 11 and variably setting the voltage control correction amount in accordance with the calculated differentiation amount of the difference ΔVH. Alternatively, the control state amount of the torque control may be calculated by integrating the difference ΔT1 between the target torque T1* and the output torque T1 of the first AC motor 11 and variably setting the voltage control correction amount in accordance with the calculated integration amount of the difference ΔVH. It is also possible that the control state amount of the torque control may be calculated by using two or all (three) of the difference ΔT1, the differentiation amount of the torque difference and the integration amount of the torque difference.

Each of the difference ΔT1 between the target torque T1* and the output torque T1, the differentiation amount of the torque difference and the integration amount of the torque difference precisely reflects the variation in the output torque T1 caused by the torque control. Therefore, by using these calculated amounts and the relation of the variations of the system voltage VH relative to the variations in the output torque T1 of the first AC motor 11, the voltage control correction amount, which is required to suppress influence of the variation in the output torque T1 (AC voltage variation) of the first AC motor 11 caused by the torque control, can be determined precisely.

After calculating the voltage control correction amount, the turn-on duty ratio Dc of the switching elements 40 and 41 of the boosting converter 21 is corrected in the voltage control by using the calculated voltage control correction amount. As a result, the variation in the output torque T1 (AC voltage variation) caused by the torque control is restricted from influencing the system voltage VH.

According to the above embodiment, the decoupling control section 62 performs the decoupling control operation, by which the control state amount of the torque control (for example, the phase φ1 of the AC voltage supplied to the first AC motor 11) is corrected based on the control state amount of the voltage control (for example, the difference ΔVH between the target voltage VH* and the system voltage VH). As a result, the variation in the system voltage VH caused by the voltage control is made less influential on the output torque T1.

Further, the control state amount of the voltage control (for example, the turn-on duty ratio Dc of the switching elements 40, 41 of the boosting converter 21) is corrected based on the control state amount of the torque control (for example, the difference ΔT1 between the target torque T1* and the output torque T1). As a result, the variation in the output torque T1 caused by the torque control (AC voltage variation) is made less influential on the system voltage VH. Thus, the voltage control and the torque control can be performed without interfering each other. Since the performance of the voltage control and the torque control is enhanced, the variations in the system voltage and the output torque can be readily suppressed.

The above embodiment may be modified in many ways.

For example, decoupling control may be performed so that voltage control of the boosting control section 59 and torque control of the second torque control section 61 for the second AC motor 12 may not interfere each other.

In a system, which performs torque control for the first AC motor 11 and the second AC motor 12 by adjusting phases of the AC voltages supplied to the first AC motor 11 and the second AC motor 12 so that the output torques of the AC motors 11 and 12 attain the target torques of the AC motors 11 and 12, respectively, the voltage control and the torque control of each AC motor may be decoupled not to interfere each other by correcting the control state amount of the voltage control in accordance with the control state amount of the torque control. According to this decoupling operation, mutual interference between torque control and voltage control for each AC motor can be prevented and the controllability of torque control and voltage control for each AC motor can be enhanced. In this case, with respect to each AC motor, the variation amount of the system voltage may be estimated based on the control state amount of the torque control and the control state amount of the voltage control may be corrected based on the estimated control state amount, so that the torque control and the voltage control may not interfere each other. As a result, the output torque variation caused by each torque control can be surely restricted from influencing the system voltage.

In a case of a plurality of AC motor systems, in which all systems are connected to the same system power line, a torque variation (difference) of each AC motor system may be converted into a system voltage variation and the decoupling control may be performed by using a sum of the system voltage variations in the system voltage control. According to this control, the system voltage variation and the torque variation can be restricted from influencing each other whether the each AC motor system is in the motor operation or in the power generation, or whether the torque variation is increasing or decreasing.

Only one of the correction of the control state amount of the torque control in accordance with the control state amount of the voltage control and the correction of the control state amount of the voltage control in accordance with the control state amount of the torque control need may be performed without performing both correction operations.

The electric vehicle need not be a split-type, which divides the motive power of the engine by a planetary gear set, but may be a parallel-type or a series-type. The electric vehicle need not have both an engine and an AC motor, but may have only the AC motor. The number of the AC motor systems including the inverter and the AC motor may be only one or more than two.

What is claimed is:

1. A motor control apparatus for an electric vehicle comprising:
   voltage conversion means, connected between a DC power source and a system power line, for supplying a DC system voltage to the system power line by converting a voltage of the DC power source;
   an AC motor system including power conversion means and a motor/generator, the power conversion means being connected to the system power line and configured to perform conversion between DC power and AC power, and the motor/generator being driven by the power conversion means;
   voltage control means configured to perform voltage control, so that the system voltage attains a target voltage;
   torque control means configured to perform torque control, which controls the power conversion means, and adjusts a phase of an AC voltage supplied to the motor/generator so that an output torque of the motor/generator attains a target torque; and
   decoupling control means configured to perform decoupling control, which restricts interference between the voltage control and the torque control by correcting a control state amount of one of the voltage control and the torque control by a control state amount of an other of the voltage control and the torque control.

2. The motor control apparatus according to claim 1, wherein the decoupling control means is configured to correct the control state amount of the torque control by, as the control state amount of the voltage control, at feast one of a difference between the target voltage and the system voltage, a differentiation amount of the difference and an integration amount of the difference.

3. The motor control apparatus according to claim 1, wherein the decoupling control means is configured to calculate a correction amount in accordance with the control state amount of the voltage control and a relation of a variation amount of the output torque relative to a variation amount of the system voltage, and correct the control state amount of the torque control in accordance with the correction amount.

4. The motor control apparatus according to claim 1, wherein the decoupling control means is configured to correct the control state amount of the voltage control by using, as the control state amount of the torque control, at least one of a difference between the target torque and the output torque, a differentiation amount of the difference and an integration amount of the difference.

5. The motor control apparatus according to claim 1, wherein the decoupling control means is configured to calculate a correction amount in accordance with the control state amount of the torque control and a relation of a variation amount of the system voltage relative to a variation amount of the output torque, and correct the control state amount of the voltage control based on the correction amount.

6. A motor control apparatus for an electric vehicle comprising:
   voltage conversion means, connected between a DC power source and a system power line, for supplying a DC system voltage from the DC power source to the system power line;
   a plurality of AC motor systems including power conversion means, a motor/generator and torque control means, the power conversion means being connected to the system power line and being configured to convert DC power of the system voltage to AC power, the motor/generator being driven by the power conversion means, and the torque control means being configured to perform torque control by adjusting a phase of an AC voltage supplied to the motor/generator so that an output torque of the motor/generator attains a target torque;
   voltage control means configured to perform voltage control, which controls the voltage conversion means, so that the system voltage attains a target voltage; and
   decoupling control means configured to perform decoupling control, which restricts interference between the voltage control and the torque control by correcting a control state amount of the voltage control in accordance with a control state amount of each torque control of the plurality of AC motor systems.

7. The motor control apparatus according to claim 6, wherein the decoupling control means is configured to estimate a variation amount of the system voltage in accordance with the control state amount of the torque control in each of the plurality of AC motor systems, and corrects the control state amount of the voltage control in accordance with an estimated variation amount so that the interference is restricted.

* * * * *